Sept. 23, 1958     O. W. WINTER     2,852,819
MACHINE FOR MAKING SHELL MOLDS
Filed Oct. 19, 1953     10 Sheets-Sheet 1
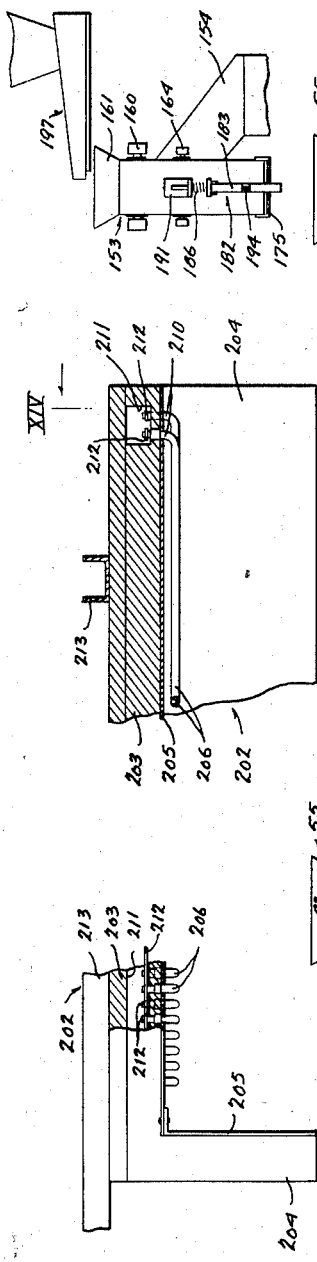
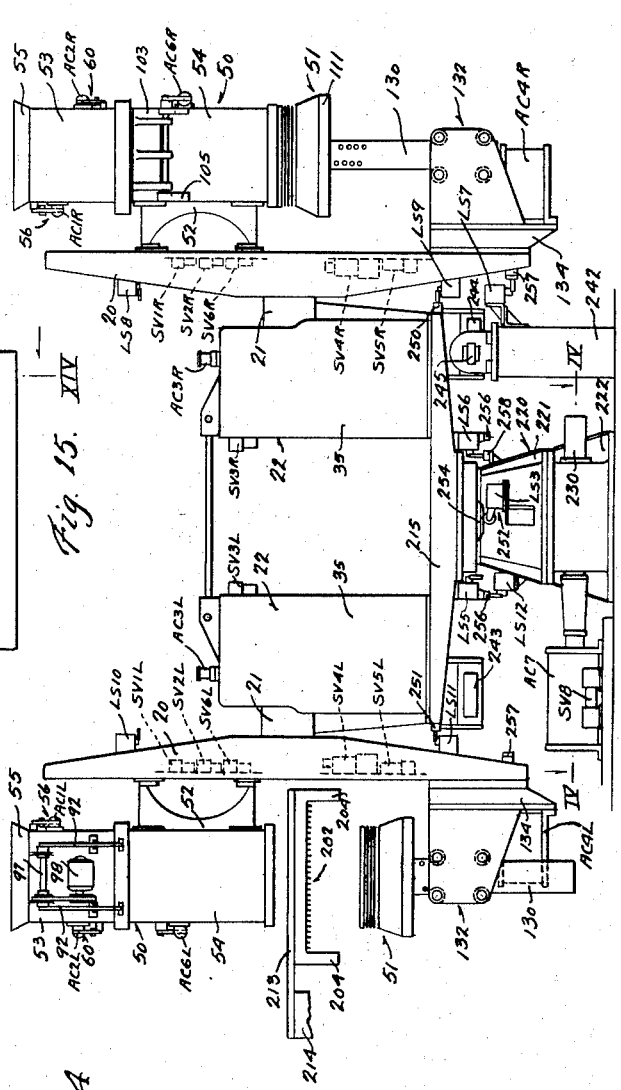
INVENTOR.
OTTO W. WINTER
BY
Beau, Brooks, Buckley, Beau.
ATTORNEYS

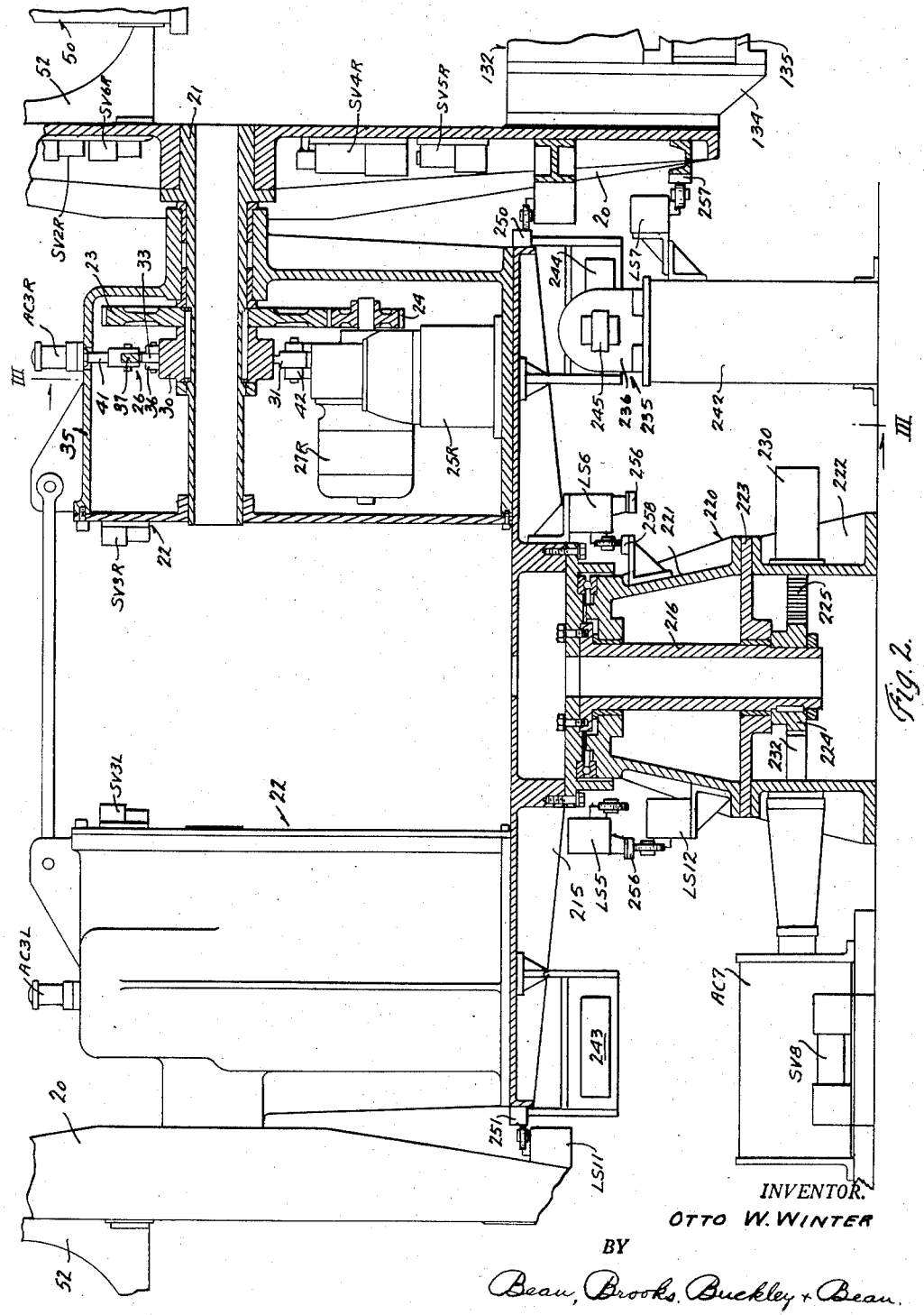

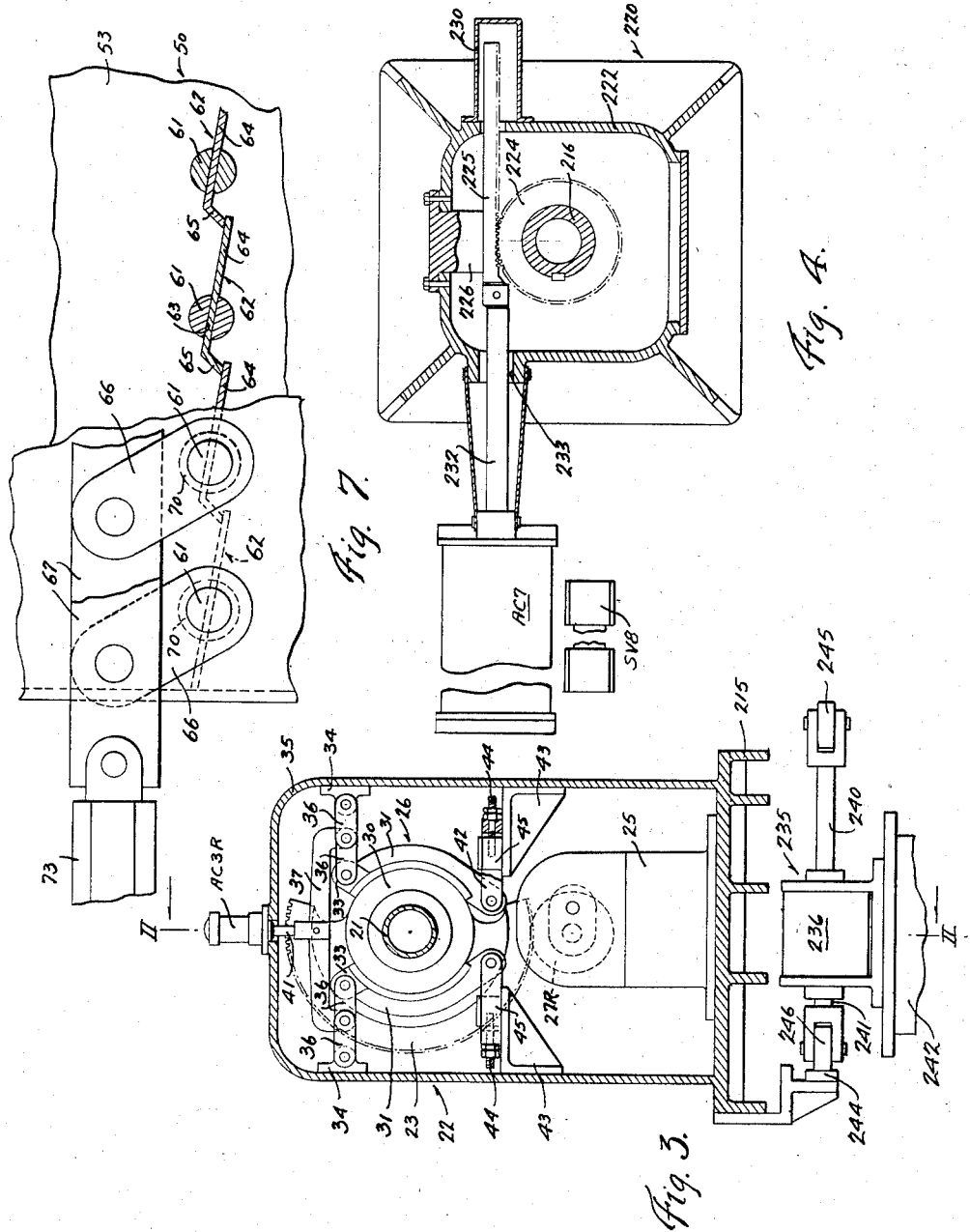

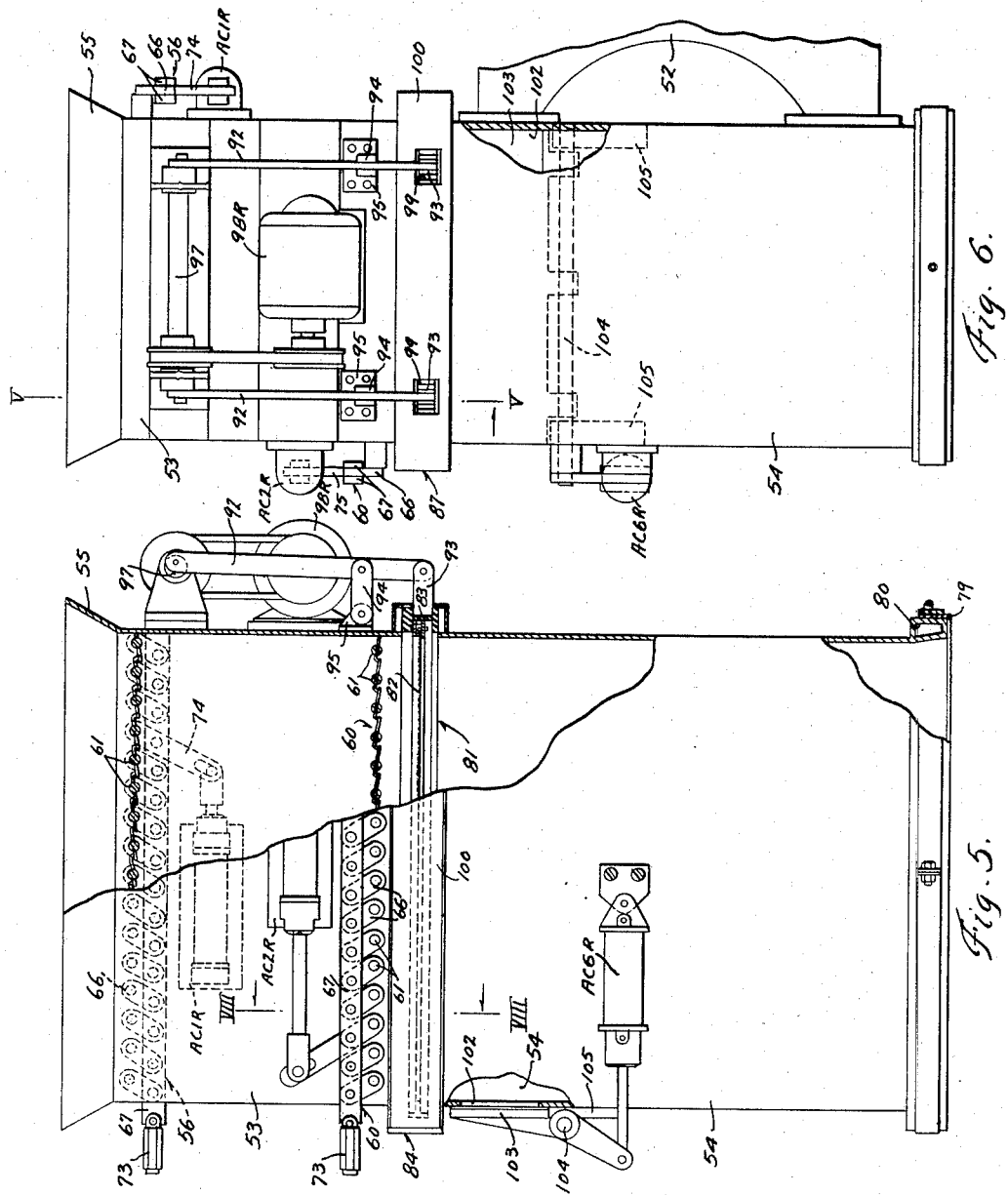

Sept. 23, 1958     O. W. WINTER     2,852,819
MACHINE FOR MAKING SHELL MOLDS

Filed Oct. 19, 1953     10 Sheets-Sheet 5

INVENTOR.
OTTO W. WINTER
BY
Beau, Brooks, Buckley & Beau
ATTORNEYS

INVENTOR.
OTTO W. WINTER

INVENTOR.
OTTO W. WINTER
BY
Bean, Brooks, Buckley & Bean.
ATTORNEYS

Sept. 23, 1958     O. W. WINTER     2,852,819
MACHINE FOR MAKING SHELL MOLDS
Filed Oct. 19, 1953     10 Sheets-Sheet 8

INVENTOR.
OTTO W. WINTER
BY
Bean, Brooks, Buckley & Bean.
ATTORNEYS

Sept. 23, 1958     O. W. WINTER     2,852,819

MACHINE FOR MAKING SHELL MOLDS

Filed Oct. 19, 1953     10 Sheets-Sheet 9

INVENTOR.
OTTO W. WINTER
BY
Bean, Brooks, Buckley & Bean.
ATTORNEYS

United States Patent Office 2,852,819
Patented Sept. 23, 1958

2,852,819

MACHINE FOR MAKING SHELL MOLDS

Otto W. Winter, Grand Island, N. Y.

Application October 19, 1953, Serial No. 386,721

46 Claims. (Cl. 22—20)

My invention relates in general to machines for making molds for metal castings, and in particular to a machine for making shell molds.

My machine is designed particularly for making shell molds under the so called Croning Process. As is well known, under this process, a hot pattern is placed upon a pattern support and a mixture of sand and resin is poured, showered, or sprayed thereupon. The sand mixture conforms to the pattern and the heat of the pattern causes the mixture to become semi-cured. The mold is subsequently placed in a heated oven where it is finally cured. After two half molds are completed, they are fastened together and are usually supported while the casting is being made.

The principal object of my invention is to provide a machine whereby the steps of the process may be automatically carried out.

Another object is to provide a machine having a number of mold units movable to various stations for accomplishing the steps for the process.

Another object is to provide a machine having a number of oscillating units, each unit designed to carry a sand box and a pattern, whereby sand mixture may be showered upon the pattern when in one position and the surplus sand returned to the sand box when in another position.

A further object is to provide a reciprocating heater plate and means for moving it toward and away from the discharge end of the sand box.

A further object is to provide a sand box with means for discharging sand and resin lumps therefrom while it is being inverted to its normal upright position.

A further object is to provide the sand box with a sifting screen mounted in resilient material and actuated by suitable vibrating means.

Another object of my invention is to provide a stationary weighing bucket registerable with the sand box of one of the oscillating units, and with a stationary oven registerable with the pattern of one of the other units.

A further object is to provide a turntable for supporting the oscillating units and indexing them to their operating positions.

Moreover, it is an object to provide my machine with a weighing device by which a measured amount of sand mixture may be supplied to the sand box at the beginning of each mold-forming cycle.

Furthermore, my device is provided with a scales bucket having a solenoid-controlled outlet pan with means for sustaining the impact upon the pan of the sand mixture entering the bucket and means assuring the closing of the pan before further quantity of mixture is received thereby.

The above objects and advantages have been accomplished by the device shown in the accompanying drawings, of which:

Fig. 1 is a side elevation of my complete device;

Fig. 2 is an enlarged fragmentary view showing some of the parts in section, and is taken on line II—II of Fig. 3;

Fig. 3 is an enlarged sectional elevation of the actuating mechanism for the turnover plate and is taken on line III—III of Fig. 2;

Fig. 4 is an enlarged sectional plan view of the base taken on line IV—IV of Fig. 1;

Fig. 5 is a side elevation partly in section of the sand box of my device;

Fig. 6 is an end elevation of the same;

Fig. 7 is an enlarged fragmentary side elevation of one of the shutters, showing a portion broken away;

Fig. 14 is an enlarged fragmentary side elevation of the oven of my device, partly in section, taken on line XIV—XIV of Fig. 15;

Fig. 15 is an enlarged fragmentary sectional view of the oven;

Figure 8:
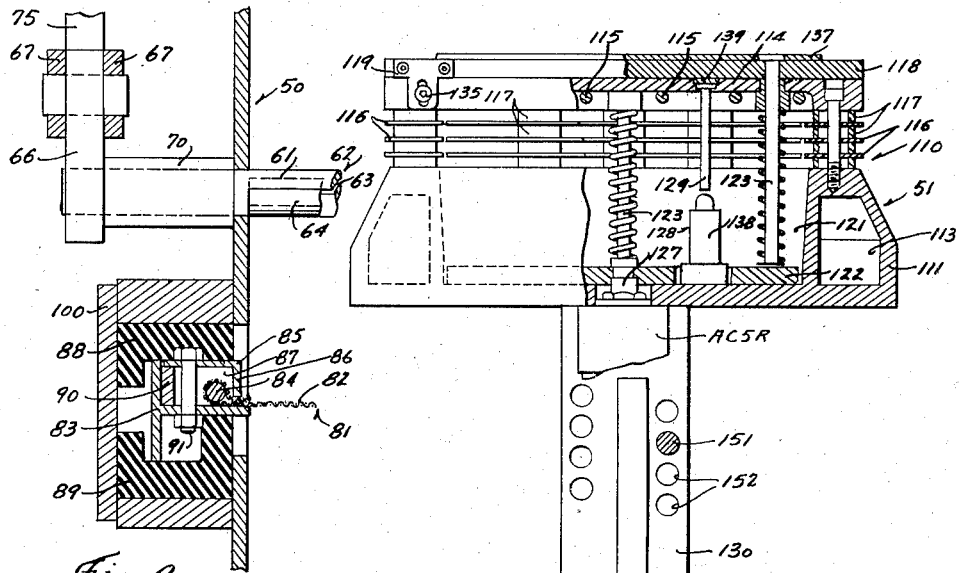
Fig. 8 is an enlarged fragmentary sectional view taken on line VIII—VIII of Fig. 5.
Figure 9:
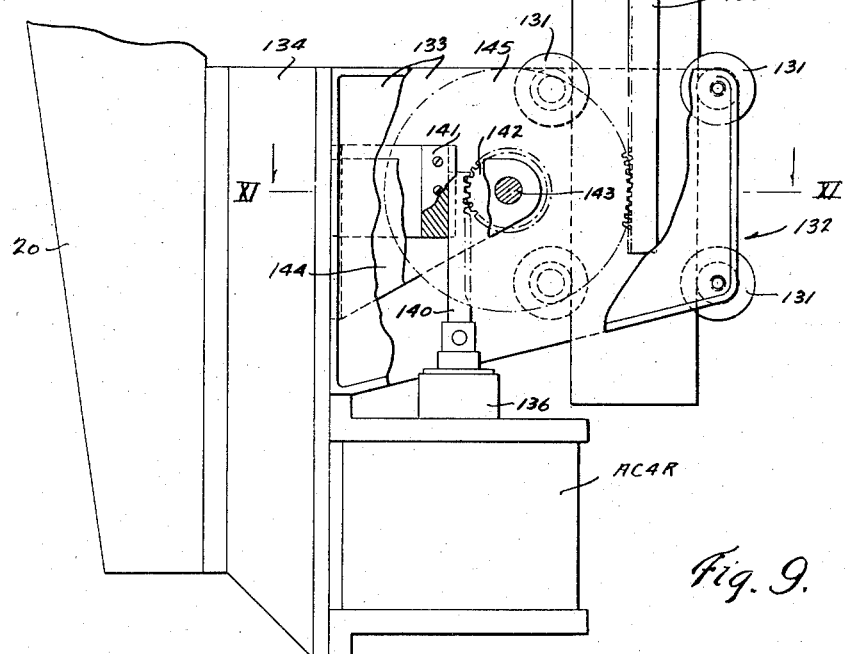
Fig. 9 is an enlarged side elevation of the pattern and heater plate assembly of my device partly in section, and showing the mechanism for actuating the same partly broken away.
Figure 10:
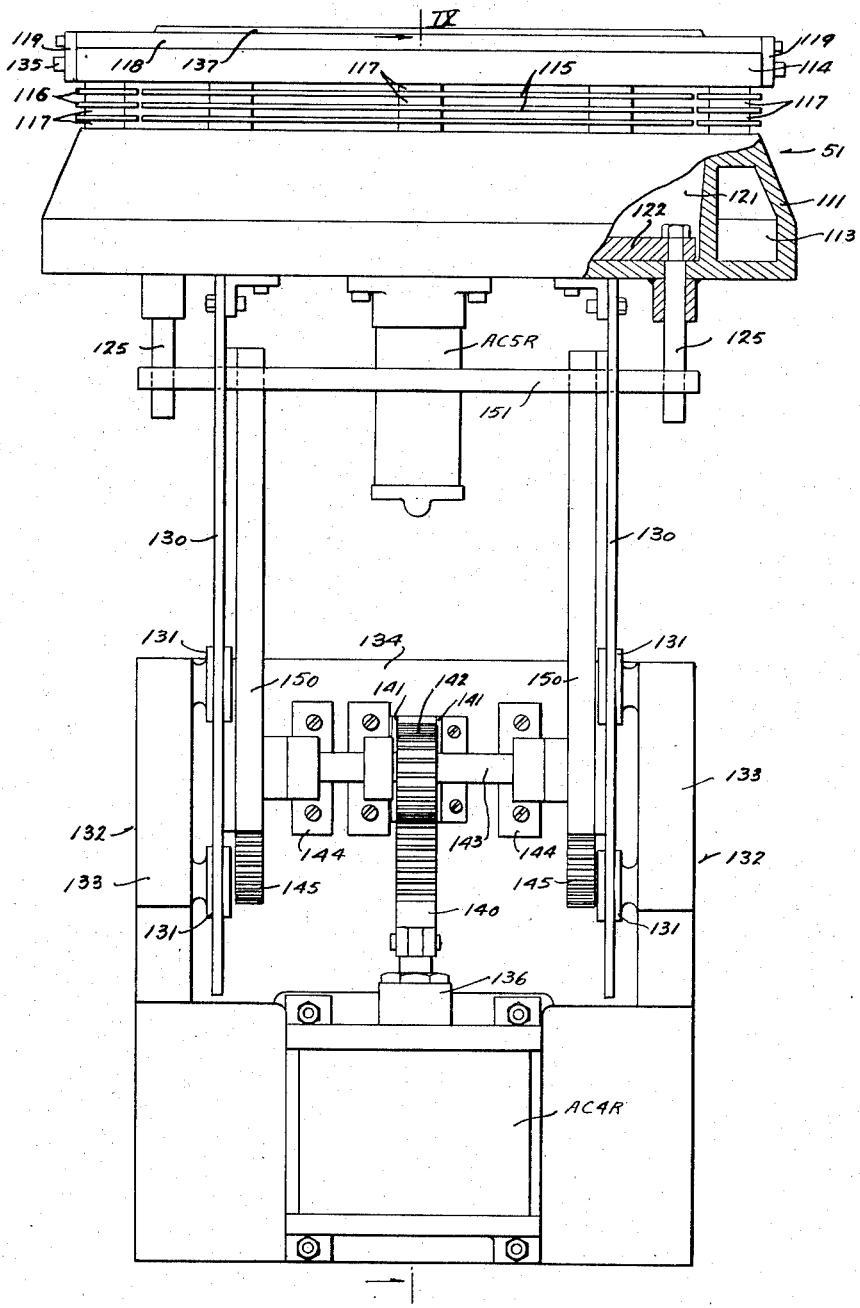
Fig. 10 is a front elevational view of the apparatus shown in Fig. 9.
Figure 11:
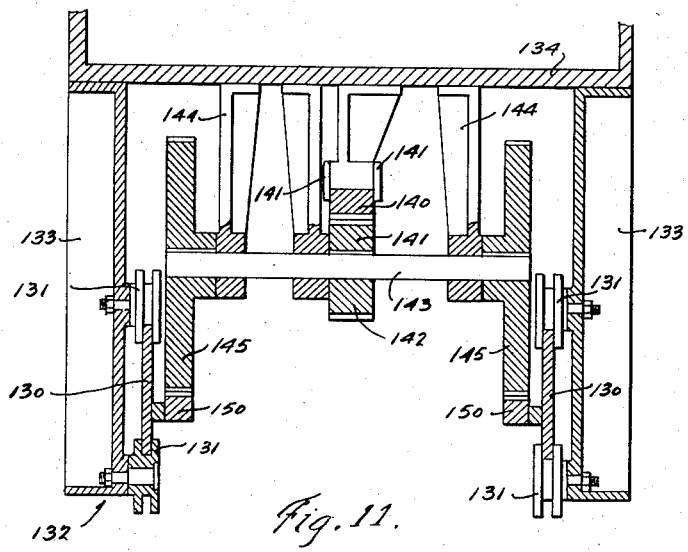
Fig. 11 is a sectional plan view of the pattern and heater plate assembly actuating means and is taken on line XI—XI of Fig. 9.

In carrying out my invention, I may employ one or a number of mold-making units, and for convenience I have shown the use of two oppositely arranged units, referred to hereinafter as right-hand and left-hand units when viewed in Fig. 1.

Each of the units comprises a turnover plate 20, each of which, as clearly shown in Fig. 2, is mounted for oscillation upon a hollow shaft 21. The shaft is mounted in suitable bearings supported by the actuating mechanism 22. In carrying out the mold-forming process by means of my invention, as will be apparent hereinafter, it is necessary that the shaft and plate be oscillated back and forth through substantially 180°. The actuating mechanism, therefore, may comprise a segmental gear 23 with which a gear pinion 24 meshes. The pinion 24 of the right-hand unit is driven by a speed reducing and reversing device 25R and the left-hand pinion by a device 25L (not shown) of any suitable design and driven by electric motors 27R and 27L, respectively. The gear 23 is mounted upon the shaft 21 of each device and the reversing mechanism permits each plate to be oscillated through its prescribed path, first in a forward direction and then in a reverse direction. In order to control the movement of the turnover plate, and to stop it at predetermined index points, I provide a brake 26 upon each of the shafts 21. Each of these brakes comprises a brake drum 30 against which brake shoes 31 are brought to bear. Each brake shoe is formed at its upper end with a lug 33 which is connected to a bracket 34, carried by the housings 35, by means of a pair of toggle links 36. Connecting each pair of toggle links is a brake yoke 37 which is moved vertically to actuate the brake bands through the medium of separate brake cylinders AC3R for the right-hand unit and AC3L for the left-hand unit each of which is connected to the brake yoke by means of a rod 41. The lower end of each brake shoe is carried by a brake clevis 42. Each clevis is adjustably supported by a bracket 43, and an adjusting screw 44 is passed through the clevis and is secured to a bracket block 45 fixed to its associated bracket 43.

Each turnover plate 20 carries a sand box 50 at one end and a pattern assembly 51 at the opposite end thereof. Each sand box which is preferably tubular in form is secured to the turnover plate by means of a bracket 52, and is formed with a storage compartment 53 and a discharge compartment 54. The upper end of the storage compartment is provide with a suitable funnel 55 for the reception of the sand mixture which is received from the weighing device, to be hereinafter described. Arranged in the upper end of the sand box and at the entrance to the storage compartment is an inlet shutter 56, and at the lower end thereof is an outlet shutter 60. As shown in the drawings, the sand box is open at its lower end and the outlet shutter 60 is so spaced therefrom that sand discharged from the storage compartment will be showered upon the pattern with sufficient velocity and impactive force to produce a packed mold. Each of these shutters comprises a series of spaced shutter shafts 61, each carrying one of the shutter blades 62 which may be mounted in a diametrically arranged slot 63 formed in the shaft. Each blade is preferably formed with a straight portion 64 and an angular portion 65. The surfaces of the blades may if desired, be coated with rubber or the like (not shown) to reduce the tendency of the shutter blade to leak. As shown in Fig. 7 the shutter is in its closed position, in which position, the angular portion of each of the blades contacts the straight portion of the adjacent blade. Each of the shafts 61 carries a shutter arm 66, and the upper end of each of these arms is pivotally disposed between and attached to two spaced shutter links 67. Suitable spacers 70 are located between the wall of the sand box and the inner surfaces of the shutter arms to keep the arms spaced from the wall and in registration with suitable air cylinders AC1R and AC2R for the right-hand plate, and cylinders AC1L and AC2L for the left-hand plate for actuating the inlet and outlet shutters 56 and 60, respectively. Each of the shutters 56 and 60 is provided with a suitable vibrating device 73 which causes the blade of the shutter to be vibrated when opening to facilitate ready passage of the sand mixture.

Arranged below the outlet shutter 60 is a sifting device 81 comprising a wire mesh screen 82 which extends across the interior of the sand box. In order that the screen may sift the sand mixture efficiently it is necessary that it be vibrated, and to this end, a T-shaped vibrating frame 83 is provided which extends around the sand box and which is disposed within a screen channel 87. The screen mesh is supported by the horizontal leg of the T-shaped frame and has its free edges passed about a retaining rod 84 which is clamped in position by means of an angle-iron clamping member 85, having its vertical leg 86 bearing upon the edge of the screen and its horizontal leg supported by means of a spacer 90. A bolt 91 passes through the horizontal leg of the clamping member and through the horizontal member of the T-shaped frame and serves to retain the screen in position. The T-shaped frame and clamping member are mounted between filler strips 88 and 89 of suitable resilient material, such as Neoprene, and these strips are disposed within the screen channel 87. The sifting screen 81 is, therefore, free to reciprocate horizontally and to be moved up and down during its operation. In order to actuate the sifting screen so as to produce the vertical and lateral motions I provide preferably two vibrating levers 92 each of which has its lower end pivotally attached to one of two spaced sifter arms 93 carried by the T-shaped frame 83. Each of the levers 92 is pivotally attached near its lower end to a vibrator arm 94 which has its other end secured to a block 95 carried by the wall of the sand box. The upper end of each vibrator lever is pivotally secured in eccentric manner to a vibrator shaft 97. This shaft is suitably mounted in bearings and is rotated by means of a motor 98 for the right-hand unit and by a motor 98L for the left-hand unit. Each motor is connected to the vibrator shaft by any suitable means. By reference to Fig. 5, it will be seen that substantially all of the vertical movement produced by the eccentric connection of the vibrator levers 92 to the shaft 97 will be transmitted to the sifter arms 93, thereby providing vigorous vertical shaking of the screen, whereas the reciprocative movement in the horizontal plane is greatly reduced by reason of the difference in the distance between their pivotally mounted ends and their connections to the arms 94. Suitable openings 99 are provided in the outer wall or cover plate 100 of the screen channel 84 for the passage of the sifter arms 93.

In carrying out the molding process by means of my apparatus, the sand mixture is showered from a height sufficient to produce a packed or rammed mold without air entrapment. The sand mixture which is not taken up in the process of molding is returned to the storage compartment of the sand box when the latter is inverted. However, semi-cured lumps of sand mixture falling from the pattern are caught by the screen so that they cannot pass into the storage compartment. In order to dispose of these lumps each sand box is provided near its upper end with an opening 102 which extends the width of the box and which is closed by means of a door 103. Each of these doors is mounted upon a shaft 104 rotatably carried by brackets 105 and controlled by means of door cylinders AC6R and AC6L. Each door is opened as the sand box is being moved to its initial upright position and is fully opened when the box has substantially reached its horizontal position, whereupon any lumps accumulated on the screen will be readily discharged through the opening. Each door will have been moved to its closed position by the time the sand box has reached its normal vertical position.

The bottom end of the sand box is provided with a water cooling space 80, whereby the lower edge portion of the sand box is kept cool and resin build-up around the edge of the box is prevented. A resilient gasket 79 is provided around the bottom of the box to prevent leakage of the sand mixture.

Figures 16, 24:
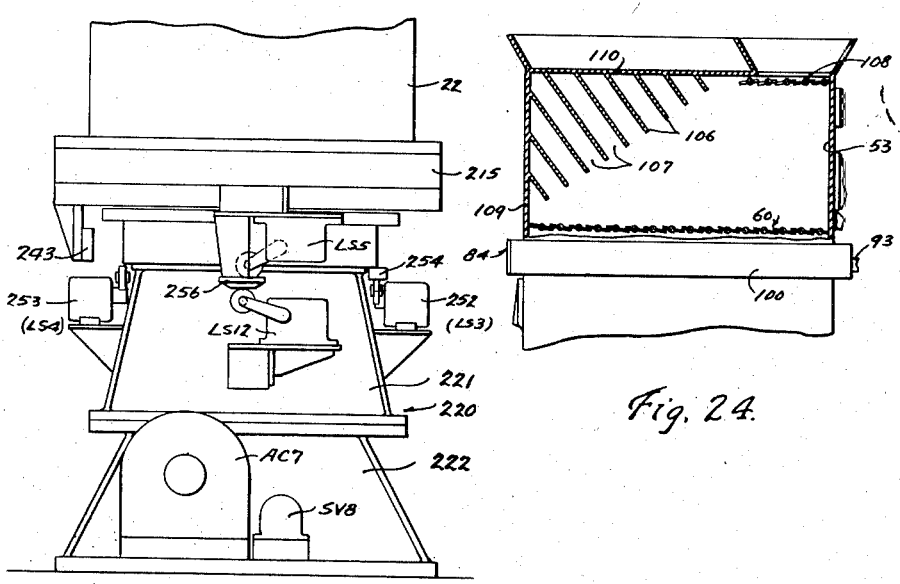
Fig. 16 is a fragmentary side elevation of the turntable and its actuating mechanism.
Fig. 24 is a fragmentary sectional view of a modified form of sand box.
Figure 20:
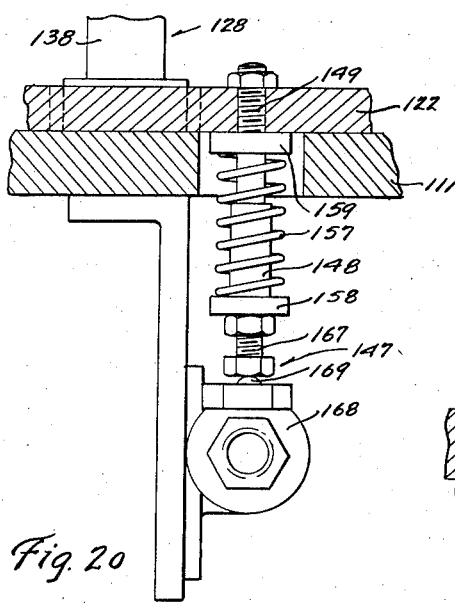
Fig. 20 is an enlarged elevation of one of the control members for the vibrator units.
Figure 17:
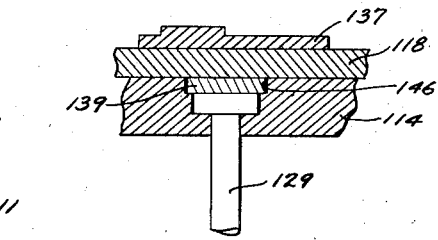
Fig. 17 is an enlarged fragmentary view of one of the vibrator bars and associated abutments.

When a more even distribution of surplus sand mixture over the outlet shutter 60 is required, I employ a plurality of baffle or distributing plates 106, shown in Fig. 24. These plates are arranged in the upper left-hand corner of the storage compartment 53 and are graduated as to length so that as the sand box is rotated in counter-clockwise direction to discharge the surplus sand mixture into the storage compartment, the sand mixture will be collected in the spaces 107 between the baffle plates 106 and thereby be distributed more uniformly over the outlet shutter when the sand box is again oscillated to its normal upright position. In this form of the invention the inlet shutter 108 is relatively narrow and is located at the side of the storage compartment which is opposite the baffle plates 106. The baffle plates are arranged at an angle and extend from the side wall 109 and from the imperforate top 110 of the sand box.

Figure 21:
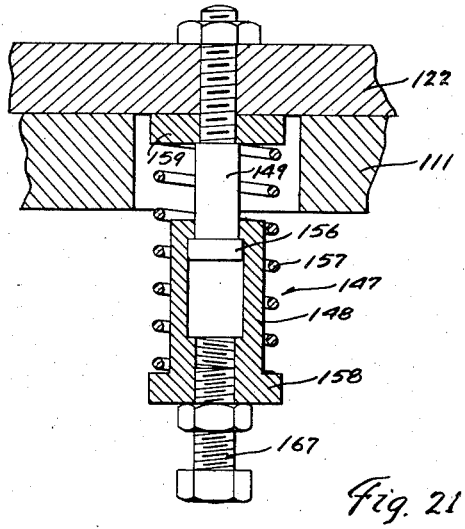
Fig. 21 is an enlarged fragmentary sectional view of one of the control members.
Figure 23:
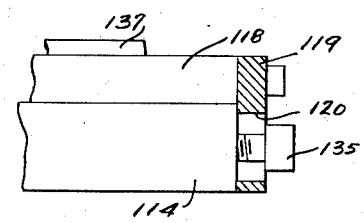
Fig. 23 is a fragmentary sectional view of a pattern plate lug and is taken on line XXIII—XXIII of Fig. 22.
Figure 22:
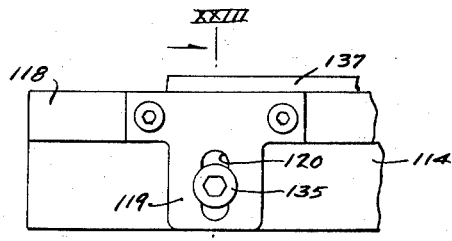
Fig. 22 is an end elevation of one of the pattern plate lugs.

The pattern assembly 51 carried by the lower end of each of the turnover plates comprises a hollow body 111 formed with a chamber 113 which is supplied with cold water from any suitable source, whereby the body may be kept cool. A heater plate 114 is spaced above the body 111, and electric resistance wires 115 are suitably secured to the under side thereof, whereby the pattern which it supports may be initially heated. Radiating fins 116 are arranged in the space between the body and the heater plate and are kept in position by means of spacers 117. A pattern plate 118 is mounted upon the heater plate 114 and is held in position thereon by means of lugs 119 which are rigidly attached to the pattern plate and overlap the edges of the heater plate. An elongated slot 120 (see Figs. 22 and 23) is formed in that part of each lug which overlaps the heater plate and a bolt 135 is passed through this slot and into the heater plate, whereby the pattern plate and pattern 137 may have limited movement relative to the heater plate in a vertical direction, and may thus be readily vibrated, as hereinafter described. The pattern is preferably made a part of or attached to the pattern plate. The body 111 is formed with a central opening 121 in which is mounted a stripper plate 122. This stripper plate engages a series of spring pressed stripper pins 123 which are slidably supported by the heater plate 114 and which normally have their upper ends substantially flush with the surface of the pattern 137. The stripper plate is guided in its vertical movement by means of guide pins 125 slidably carried by the bottom of the body 111 and secured to the stripper plate at their upper ends. The stripper plates of the right-hand and left-hand units are actuated by means of stripper cylinders AC5R and AC5L, respectively, each having its plunger 127 attached to the stripper plate. In order to facilitate the removal of the finished mold from the pattern, one or more vibrating units 128 are provided. Each unit comprises a vibrating cylinder 138, the movable plunger of which bears against an abutment rod 129. This abutment rod engages a vibrator bar 139 which is secured to the under side of the pattern plate and which engages a groove 146 formed in the heater plate. Since it is desirable that the vibration of the pattern and pattern plate occur only at the beginning of the stripping action, I provide a vibrator control member 147 for each vibrator unit. The control member comprising a cylinder 148 which is slidably mounted for limited movement upon a plunger rod 149 having a plunger 156 formed at its lower end and mounted within the cylinder. A helical spring 157 surrounds the cylinder and engages a cylinder flange 158 at its lower end and a detent washer 159 at its upper end. The plunger rod is screwthreaded into the washer and has its upper end attached to the stripper plate. An adjusting bolt 167 is carried by the cylinder 148 and it is locked in its adjusted position by means of a suitable lock nut. Arranged below the vibrator control member is a blow valve 168 having its plunger 169 normally engaged by the head of the bolt 167. This valve is an article of standard manufacture and it is connected by suitable means (not shown) in the air line to the vibrator cylinder 138. The plunger 169 of the blow valve is normally depressed to its open position when the stripper plate is in its lower position, thereby providing open communication for the passage of air to the vibrator cylinder when the stripper cylinder AC5R is supplied with air through the solenoid valve SV5R. As the stripper plate is elevated by the air cylinder AC5R, the vibrator cylinder will also receive air and will cause the pattern and the pattern plate to be vibrated. During the time the pattern is vibrated, the blow valve is held in open position by means of the spring 157 which has been compressed by the downward movement of the stripper plate. The spring will therefore keep the cylinder 148 and bolt 167 urged downwardly in contact with the blow valve until such a time as the plunger 156 thereof reaches the end of its travel in the cylinder as shown in Fig. 21. When this occurs, the cylinder and bolt will be pulled upwardly away from the blow valve plunger 168 by the stripper plate, thus allowing the valve to close, thereby cutting off the air to the vibrator cylinder 138.

After the pattern with its pattern plate has been placed upon the heater of each molding unit it is necessary to elevate the pattern assembly so as to bring the surface of the pattern plate up to and in contact with the lower edge of the sand box. In order to accomplish this, I provide an actuating mechanism having two downwardly extending guide bars 130 secured at their upper ends of the body to the assembly and supported for vertical movement between oppositely arranged grooved rollers 131. These rollers are carried by a frame 132 and are pivotally secured to spaced frame brackets 133. These brackets are secured to the turnover plate through the medium of a spacing block 134. Centrally arranged between the brackets 133 of the right-hand assembly is an actuating cylinder AC4R, and an actuating cylinder AC4L is provided for the left-hand assembly. The plunger 136 of each of these cylinder carries a pinion rack 140. Each of these racks extends upwardly and is suitably supported by a rack guide 141. Each rack engages a pinion 142 secured to a shaft 143. Each shaft is rotatably supported by suitable brackets 144 carried by the block 134, and each shaft has a gear 145 secured to each end thereof. Each gear 145 engages a gear rack 150 which is carried by and secured to each of the guide bars 130. A stop bar 151 is engageable with any pair of a number of registering apertures 152 formed in the guide bars, and it is so positioned that the pattern actuating mechanism will be stopped in its downward movement in the proper vertical and most efficient position for final curing in the oven.

My apparatus is provided with a sand mixture scales or balance 153 which comprises a scales bracket 154, mounted upon a suitable stationary support 155. The balance comprises a yoke 160 which carries a scales bucket 161 at one end and a counterbalance weight 162 mounted at the other end upon a counterbalance rod 163. A parallel bar 164 is provided at each side of the bucket so as to maintain substantially parallel movement thereof during its vertical travel. These bars are pivotally attached at one end to the scales bucket, and at their other ends they are pivotally secured to the scales bracket 154. A balance arm 165 is mounted upon the yoke 160, and a weight block 166 is adjustably carried by the arm and locked in position by means of a set screw 170. The scales bracket 154 carries a stationary bar 171 which has a limit screw 172 at each end thereof. Each limit screw is engageable with a registering boss 173 carried by the yoke 160. A micro-switch 174 is suitably supported at one end of the stationary bar, and is of the normally open type, so that when the scales bucket is empty its contacts are in closed position. A scales pan 175 is provided for the bucket 161 and it is formed with a pivot block 176 which is pivotally attached to the lower end of the scales bucket 161 by means of a pivot bracket 177. The scales pan 175 is provided with a counterbalance weight 180 which is carried by a rod 181 secured to the pivot bracket 176. A scales pan latch 182 is provided which comprises a latch arm 183 pivoted at its upper end to a latch bracket 185 and formed with a right angled arm 190 for bearing engagement with the lower end of a latch spring 186. An angle bracket 191 carried by the bucket has bearing engagement with the upper end of the spring and causes the latch arm to be forced inwardly toward the bucket. A latch 184 is provided at the lower end of the arm for engagement with the scales pan 175 to keep it in its closed position. A latch solenoid 192 is provided for releasing the latch and it is supported by a suitable stationary part 193. The solenoid is connected to the latch arm 183 by means of a solenoid rod 194. The end of the rod preferably has a play connection with the arm, and a spring 195 serves to keep it normally in one position.

Figure 12:
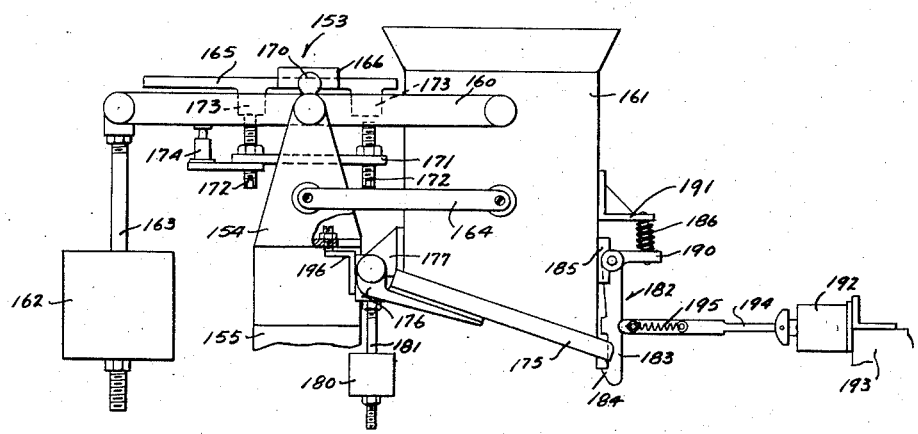
Fig. 12 is a side elevation of the scales forming a part of my invention.
Figure 13:
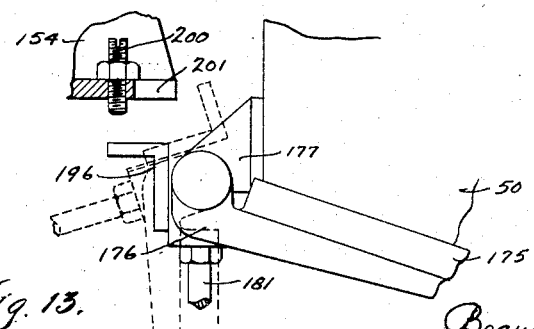
Fig. 13 is an enlarged detail view of the scales mechanism.

The scales is provided with a detent angle 196 which is carried by the pivot block 176. The horizontal leg of this angle normally engages a detent screw 200, carried by the scales bracket 154, when the bucket is in its upper, empty position. As the bucket is loaded and moved downwardly under the weight of the sand mixture, the pivot block and detent angle will be moved to a position where the horizontal leg of the detent angle will clear the lower end of the detent screw and allow it to pass through a slot 201 formed in the supporting bracket. When the sand bucket has been emptied into the sand flask, the counterweight 180 will cause the scale pan to be closed which will bring the detent angle to it normal position as shown in Fig. 12. In this position the horizontal leg will again engage the end of the detent screw when the bucket has been moved upwardly to its normal empty position, thus assuring the closure of the scales bucket before another charge of sand mixture is supplied thereto. Mounted over the scale bucket is a feeder mechanism 197 of any conventional type which serves to feed the previously prepared sand mixture in predetermined amounts into the bucket, the amount being controlled by means of the micro-switch 174.

My device is provided with a curing oven 202 which is stationarily arranged on the side of the turntable which is opposite to the scales 153. As shown in Fig. 1, this oven is of inverted U shape having a top portion 203 of insulating material and two downwardly projecting leg portions 204 also of insulating material. The lower surface of the horizontal portion 203 and the inner surfaces of the downwardly extending portions 204 are covered with sheets of suitable material 205, such as stainless steel to reflect the heat of the oven onto the partially finished mold. The oven is provided with a series of electric resistance units 206 each of which is formed with an upwardly extending end 210 which projects into a recess 211 formed in the insulating material of the top portion 203 of the oven. These ends are provided with suitable fastening means for holding them in position, and suitable bus bars 212 are secured thereto to connect them together and to a suitable source of electricity. The oven is preferably supported by a number of channel-iron members 213 disposed laterally across the top thereof and extending beyond one edge thereof for attachment to a suitable stationary member 214.

In order to rotate the mold-making units from one position to another, I provide a turntable 215 which supports the turnover plate-actuating mechanisms 22. This table is carried by a vertical shaft 216 which is suitably journaled in a base 220. This base preferably comprises an upper portion 221 and a lower portion 222, between which is disposed a bearing plate 223 for the support of the lower end of the shaft. An actuating pinion 224 is secured to the lower projecting end of the shaft 216, and a turntable gear rack 225 is engageable therewith. This rack is held in mesh with the engaging pinion by means of a rack guide 226. A rack housing 230 is secured to one side of the lower portion of the housing for the reception of the end of the rack which latter passes through an opening formed in the base. The turntable rack is actuated by a double acting turntable cylinder AC7, the plunger 232 of which passes through an opening 233 formed in the base and has its inner end connected to one end of the turntable rack 225. So as to check the inertia of the moving turntable as it approaches its index positions, I provide a shock absorber 235 comprising a cylinder 236 and two oppositely arranged piston rods 240 and 241, each connected at its inner end to the piston (not shown) of the cylinder. The shock absorber is carried by a suitable standard 242 disposed underneath the turntable, and abutment plates 243 and 244 are carried at opposite ends of the table for contact alternately with rollers 245 and 246, respectively, carried at the ends of the piston rods.

When shell molds are to be made by my device, one of the molding units is brought into registration with the sand bucket 161 of the scales 153, and the pattern plate with its pattern is placed in position upon the heater plate. The plate assembly is then elevated to bring the top of the pattern plate in contact with the bottom edge of the sand box, as clearly shown in Fig. 1. A predetermined amount of sand, having been previously supplied to the storage compartment 53 of the box from the scales bucket 161, through the open inlet shutter 56, the outlet shutter 60 is then opened and the sand mixture is sifted through the vibrating screen 81 and is showered onto the pattern. In order to facilitate free passage of the sand mixture through the inlet and outlet shutters the vibrating mechanisms 73 are actuated as the shutters are opened. The sand supplied to the scales bucket by the feeder 197 is controlled by the closing of the normally open microswitch 174 through the medium of the scales yoke 160, and the supply of sand is equal in amount to that which is required for each mold. The feeder which is a standard article of manufacture is provided with the usual actuating means (not shown) which is energized from a suitable source of electricity through a suitable electric circuit (not shown) in which the micro-switch 174 is connected. The sand mixture in the scales bucket is discharged by tripping the pan latch 182 through the medium of the latch solenoid 192 which allows the pan 175 to move about its pivot point and open the bottom of the scales bucket. As hereinbefore described, the detent screw 200 will permit the scales pan to open only when the latter has received its charge of sand mixture and will insure the closing of the pan when the bucket is empty and before it receives another charge.

The sand mixture after falling through the discharge chamber 54 of the sand box will be deposited upon the pattern and the pattern plate, and impacted upon and readily conformed to the pattern. In order to cause particles of the sand mixture to adhere as they conform to the pattern, the pattern and the pattern plate are initially heated by means of the heating elements carried by the heater or by suitable heater elements carried by the pattern plate (not shown). The sand mixtures having been deposited upon the pattern and the pattern plate, the turnover plate 20 is now rotated through substantially 180° so as to invert the molding assembly which causes the surplus sand mixture not taken up by the mold to be deposited upon the screen and to be sifted back into the storage compartment, the outlet shutter 60 being open and the inlet shutter 56 being closed during this operation. After all of the loose particles of the sand mixture have been sifted into the storage compartment, the turnover plate is again rotated so as to bring the sand box to its normal upright position. During the return movement of the sand box the sand-resin lumps formed in the discharge compartment are disposed of through the opening 102 when door 103 is opened by the actuation of the actuating cylinder AC6R for the right-hand plate or the actuating cylinder AC6L for the left-hand plate. After the molding assembly of the right-hand turnover plate has reached its normal upright position, the turntable 215 is rotated through substantially 180° which brings the right-hand pattern plate with the semi-cured mold into the oven 202 where it is finally cured.

While the right-hand mold is being finally cured in the oven, the left-hand molding unit is in registration with the scales bucket and another mold is prepared, as hereinbefore set forth. In other words, the pattern is initially heated at or before the next investment which constitutes the beginning of another cycle. When the left-hand mold has been completed and the surplus sand mixture returned to the storage compartment and the lumps removed from the sand box, the turntable is again rotated so as to bring the left-hand mold into the oven, and the right-hand molding unit back to its initial position. In this position the finished mold of the right-hand unit is stripped from the pattern and pattern plate by the actuation of the stripper pins 123 through the medium of the stripper plate 122 and actuating cylinder AC5R. During the stripping operation, the pattern plate and pattern are vibrated by means of the vibrator units 128 so as to more readily remove the mold from the pattern, after which the pattern is cleaned and prepared to form another mold. As hereinbefore pointed out each vibrator unit is actuated only at the beginning of the stripping movement through the medium of the vibrator control member so that when the mold is finally removed from the pattern all vibrating movement has ceased.

Figure 18:
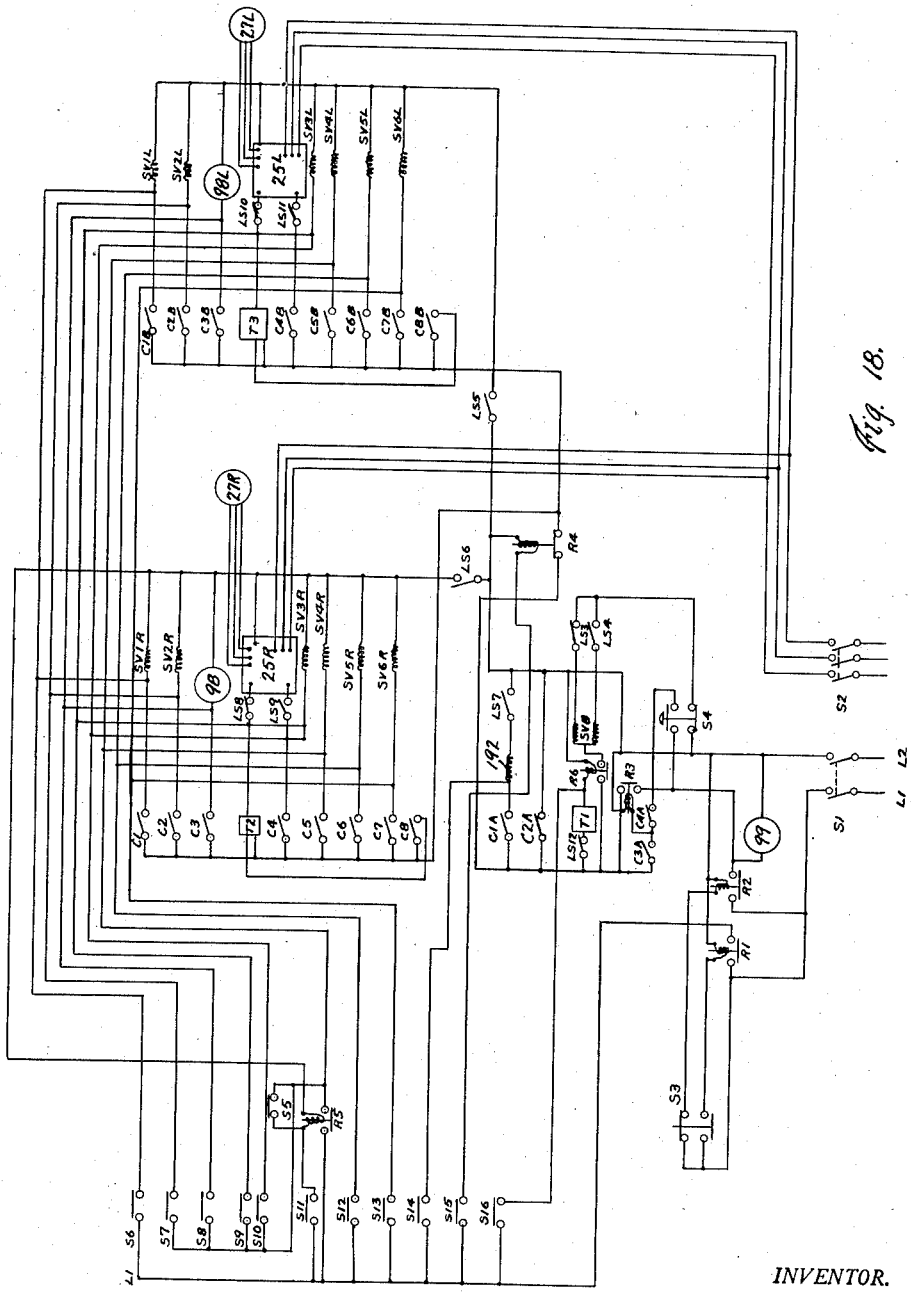
Fig. 18 is a diagrammatic view showing the various switches and solenoids, and the circuits connecting them.

In order that the steps of the molding process above described may be carried out, either automatically or manually, I employ a number of drum type controllers, limit switches, solenoid-operated valves, relays, and manually actuated switches which are all standard articles of manufacture, and which are, therefore, not shown or described in detail. These are, however, shown diagrammatically in Figs. 18 and 19 to which reference is now made. The positions of the limit switches, solenoid valves, and actuating cylinders are shown attached to the associated parts of my apparatus in some of the other views of the drawings; but, for clearness of illustration, the wires forming the circuits and the hoses conducting air or fluid to the valves and cylinders have been omitted from the several views. As shown in Fig. 18, the various solenoid valves are controlled by the contacts of the drum controllers employed, and by limit switches which are carried by various moving parts of the apparatus. The drum type controllers are shown by a suitable electric motor indicated diagrammatically in Fig. 18, only by the numeral 99.

Figure 19:
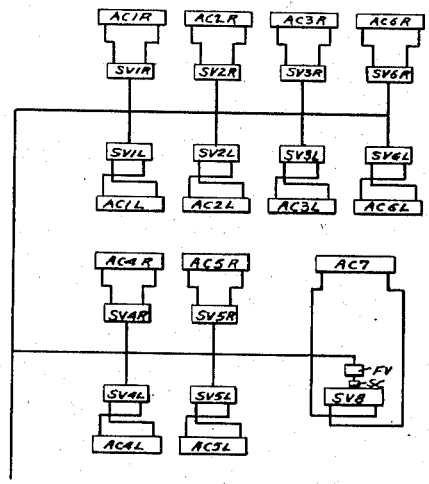
Fig. 19 is a diagrammatic view showing the air lines connected to the various solenoid valves and actuated cylinders.

Referring to Fig. 1 it will be seen that the turnover plate 20 at the right of the figure carries solenoid operated valves SV1R, SV2R, SV6R, SV4R, and SV5R for connection through suitable air lines shown in Fig. 19 to their respective actuating cylinders AC1R, AC2R, AC6R, AC4R, and AC5R. In like manner the left-hand turnover plate 20 carries solenoid-operated valves SV1L, SV2L, SV6L, SV4L, and SV5L which are connected through air lines shown in the above mentioned figure to their respective actuating cylinders AC1L, AC2L, AC6L, AC4L, and AC5L. Solenoid-operated valves SV3R and SV3L are carried, respectively, by the right-hand and the left-hand gear mechanisms 22, which when energized actuate the brake cylinders AC3R and AC3L, respectively, to retard movement of the turnover plates and to hold them in their indexed positions. A limit switch LS7 carried preferably by the standard 242 is connected in series with the scales solenoid 192 and it is actuated by a cam 257 carried by each turnover plate when the plate is in its sand receiving position. Double coil solenoid-operated valve SV8 is provided for the turntable 215, and serves to control the turntable actuating cylinder AC7. The solenoid valve SV8 when actuated, as will hereinafter be described, causes the turntable to be actuated in either direction at a predetermined speed. As shown diagrammatically, in Fig. 19, a speed control valve SC and a foot valve FV are inserted in the air line connected to the solenoid valve SV8 so that the operator may control not only the speed of movement of the turntable but may interrupt movement thereof at any time. It should be noted that all of the actuating cylinders are spring-loaded so that when released from pressure by the respective co-acting solenoid valve they will return to normal positions, except the table cylinder AC7 which is actuated in both directions by the solenoid valve SV8.

In order to index the turnover plates, I provide limit switches LS8 and LS9 which are carried near the outer ends of the right-hand turnover plate 20 and which contact a cam 250 carried by the turntable. These switches are normally closed and serve to interrupt the circuit of the motor 27R when the right-hand turnover plate has reached its indexed position. In like manner the left-hand turnover plate is provided with limit switches LS10 and LS11 which, when in index positions, contact a cam 251 carried at the opposite end of the turntable. A limit switch 252 is attached to one side of the turntable support 220 and a limit switch 253 is carried at the opposite side thereof. The switch 252 has limit switch contacts LS3; and the switch 253 has limit switch contacts LS4. Each of these limit switches which control the rotary movement of the turntable engages a cam 254 located at one side of the turntable. A limit switch LS12 is carried by the turntable support and is alternately contacted by one of two cams 256 mounted one at each side of the turntable. A limit switch LS5 is mounted upon one side of the turntable and a limit switch LS6 is mounted upon the opposite side thereof. Each of these limit switches is normally open and is designed to close the circuits to the drum controller and manual push button controls only when the associated turnover plate and sand box are in their sand-receiving positions. In one of these positions the limit switch LS6 for the right-hand plate will contact the stationary cam 258 carried by the support 220, and in the other position the limit switch LS5 will be controlled by this cam when the left-hand turnover plate is in its sand-receiving position.

As hereinbefore mentioned, I use drum type controllers for controlling the various circuits, these controllers having contacts C1, C2, C3, C4, C5, C6, C7, C8, C1B, C2B, C3B, C4B, C5B, C6B, C7B, C8B, C1A, C2A, C3A, and C4A. These contacts may be provided by separate controllers suitably connected together for unison rotation and driven by the motor 99 shown only in diagram in Fig. 18. These controllers are not shown or described in detail since they do not form a part of my invention. Referring now to Fig. 18, the contacts and circuits shown at the right of the figure, are for the actuation of the left-hand turnover plate; those at the upper middle are for the right-hand turnover plate, and those at the extreme left are for the manual actuation of either the right-hand or the left-hand plate.

When my apparatus is to be actuated through its mechanical cycle by means of the automatically controlled switches, the line switches S1 and S2 are closed. Switch S1 controls the 110 volt line for energizing all of the solenoids, and switch S2 is for conducting three phase current to the turnover plate motors 27R and 27L. After switches S1 and S2 are closed the maintained contact button switch S3 being in its closed position, current will flow through the coil of relay R2 which energizes the automatic control circuits. The manual switch button S4 is now depressed and is held momentarily in its closed position, thereby energizing relay R3 through closed contacts C4A. This energized relay is now held in its energized position by the line current through contacts C3A which are maintained in closed position until the end of the cycle when they are opened, thereby interrupting the current through relay R3. Contacts C1A of the drum controller when closed actuate the scales solenoid 192 through limit switch LS7 when the latter is closed by cam 257. The rotary drum controller now closes contacts C1 which causes the actuation of solenoid SV1R controlling the right-hand turnover plate to which reference is now being made. Closed contact C2 of the rotary controller actuates the outlet shutter 69 through the medium of solenoid valve SV2R. Closed contacts C3 energizes the screen actuating motor 98. Closed contacts C8 starts the electronic timer T2 which energizes the actuating motor 27R of the right-hand plate through the medium of the speed reducing and reversing device 25R. Movement of this turnover plate beyond substantially 180° is limited by limit switch LS8 which is carried by the turnover plate and which contacts abutment 250. The timer also actuates solenoid switch SV3R to apply the brake 26 of the right-hand plate actuating mechanism. Contacts C4 when closed reverse the direction of the motor 27R through the reversing device 25R and limit switch LS9 thus rotating the right-hand turnover plate until it reaches its normally vertical position where it will again be stopped by the actuation of the brake 26 through solenoid valve SV3R. The cycle of operation of my apparatus begins when contacts C5 of the drum controller are closed which actuates solenoid valve SV4R which raises the pattern assembly to its point of contact with the bottom of the sand box ready to receive the sand mixture. Contacts C6 are closed at the end of the cycle and cause the solenoid valve SV5R to be energized which actuates the stripper pins and vibrator units 128 to raise the mold from the pattern. Closed contacts C7 causes actuation of the solenoid valve SV6R which opens the door of the right-hand sand box for the discharge of the loose semi-cured sand resin lumps during the return movement of this sand box to its initial position. As hereinbefore stated, current through contacts S1 to C8, both inclusive, will be interrupted by limit switches LS5 and LS6 except when the turntable is in its indexed positions.

The actuation of the various parts of the left-hand molding assembly when in the scales position is substantially identical with that just described in connection with the right-hand head assembly, all corresponding contacts and solenoid valves being identified by the letters B and L. Limit switches LS10 and LS11 performs the same function in the actuation of the left-hand assembly as switches LS8 and LS9 do in connection with the right-hand assembly.

When contacts LS4 of limit switch 253 of the rotary drum controller are closed the opposite coil of the solenoid valve SV8 is energized to actuate cylinder AC7 to move the turntable from right to left. In order to prevent the actuation of the turnover plates while the turntable is being rotated to its index positions, the relay R4 is energized through C2A, thereby interrupting the supply of current to contact C1 to C8, both inclusive, and C1B to C8B, both inclusive. A timer T1 is also provided for controlled actuation of the table, and it closes the relay R6 after the time period has elapsed thus closing the circuit to either of the windings of the solenoid valve SV8. This timer is actuated through normally closed limit switch LS12, and current passing through the timer and this limit switch actuates solenoid valve SV8 through either limit switch LS3 or limit switch LS4, depending upon the direction of rotation of the table. At the end of the cycle, contacts C3A on the rotary drum controller are opened, thereby interrupting current through relay R3 and stopping the cycle which may again be started by momentarily closing contact C4A through the actuation of manually depressed switch button S4, as hereinbefore described.

Referring now to Fig. 19, I show the pipe lines carrying air or other medium under pressure to the various solenoid operated valves hereinbefore described, as well as the connections from the various solenoid valves to the corresponding actuating cylinders.

As shown in Fig. 18, a number of manually operated contacts S6 to S16 are employed; and, when the apparatus is to be controlled manually, switch S3 is moved to its opposite position which will close relay R1 thereby energizing the manual circuits. With these circuits thus energized the various solenoid valves of the right-hand turnover plate may be actuated by the manual switches when limit switch LS6 is closed. The push buttons S6 to S10, both inclusive, are connected, respectively, by electric circuits to solenoid valves SV1R, SV2R, motor 93, SV3R, and LS8, and SV3R and LS9. Push button S11 is connected to the circuit feeding solenoid SV4R through the medium of the relay R5 and normally closed switch S5. In like manner push buttons S12 to S16 are connected by electric circuits to solenoids SV5R, SV6R, 192, relay R4, and relay R6, respectively. When push button S5 is opened relay R5 will be deenergized thus interrupting the current through solenoid valve SV4R and permitting the pattern plate to be lowered. When the left-hand yoke is indexed to cycle starting position, limit switch LS5 will be closed and the manual switches just described will actuate the solenoids of the left-hand yoke corresponding to those of the right-hand yoke.

While I have shown the turnover plates or roll-over yokes 20 actuated by means of electric motors and gear reducing means, it is obvious that air cylinders may be employed to bring about the oscillation of the turnover plates, such as used to actuate the turntable 215 and the pattern assembly 51. Furthermore, while I have shown and described but two roll-over yokes, a greater number may be employed. These and other modifications may be made without departing from the spirit of my invention or the scope of the appended claims, and I do not, therefore, wish to be limited to the details herein shown and described.

What is claimed is:

1. A machine for making shell molds, comprising a turntable, hopper means disposed at one side of the table for supplying sand mixture, an oven disposed adjacent to the table and spaced from the supply means, a sand mixture flask registerable with the supply means, a pattern support for holding a pattern carried by the table and registerable with the flask, means for supplying a metered amount of sand mixture from the supply means into the flask at each mold cycle, means carried by the flask for showering the sand onto the pattern to form a shell mold, and means for periodically rotating the table to bring the pattern support and the mold into the oven.

2. A machine for making shell molds, comprising a turntable, means disposed at one side of the table for supplying sand mixture, an oven located adjacent to the table and spaced from the supply means, a plurality of turnover yokes mounted upon the table, the yokes being registerable periodically with the supply means and with the oven, a sand mixture flask carried by each yoke, a pattern support for holding a pattern carried by each yoke and registerable with the associated flask, means for supplying sand mixture from the supply means alternately to each flask, means carried by the flask for showering sand mixture from each flask onto the registering pattern to form a shell mold, and means for rotating the table to carry the pattern and the mold into the oven.

3. A machine for making shell molds, comprising a turntable, means disposed at one side of the table for supplying sand mixture, an oven located adjacent the table and spaced from the supply means, a plurality of turnover yokes mounted upon the table and spaced from each other, the yokes being registerable alternately with the supply means and with the oven, a sand mixture flask carried at one end of each yoke for periodically receiving sand mixture from the supply means, a pattern support for holding a pattern carried by the other end of each yoke and disposed in registration with the associated flask, means for showering sand mixture from each flask onto the registering pattern to form a shell mold, means for rotating the table to carry each pattern and each mold into the oven, actuating means for inverting each yoke to discharge the surplus sand mixture from the mold back into the sand flask, means for rotating each yoke following the inverting movement to move the sand flask to its normal upright position preceding the entrance of the mold into the oven, and means for stripping the finished mold from the pattern.

4. A machine for making shell molds, comprising a pattern assembly having a hollow body, means for supplying a cooling medium to the body, a heater carried by the body and in spaced relation to the body cooling means, a pattern plate carried by the heater for holding a pattern, and stripping means carried by the body for stripping the mold from the pattern.

5. A machine for making shell molds, comprising a roll-over yoke, a pattern support carried by the yoke for holding a pattern, a sand mixture flask carried by the yoke and registerable with the pattern support, the sand flask being fixed in relation to the axis of the yoke and being formed with a storage compartment and a discharge compartment, inlet shutter means carried by the flask and arranged at the inlet end of the storage compartment, outlet shutter means carried by the flask and disposed between the storage compartment and the discharge compartment, means for moving the pattern toward and in contact with the discharge end of the sand flask, vibrator means associated with the flask for sprinkling sand mixture onto the pattern to form a shell mold, means for inverting the yoke to discharge surplus sand from the mold back into the sand flask, means for stripping the shell mold from the pattern, and vibrating means carried by the pattern support for vibrating the pattern during initial stripping of the mold from the pattern.

6. A machine for making shell molds, comprising a roll-over yoke, means carried by the yoke for supporting a pattern, a sand mixture flask carried by the yoke and registerable with the pattern supporting means, the flask being fixed in relation to the axis of the yoke and being formed with a storage compartment having an inlet end and a discharge compartment having a discharge end, inlet shutter means carried by the flask and arranged at the inlet end of the storage compartment, outlet shutter means carried by the flask and disposed between the storage compartment and the discharge compartment, a sifter screen carried by the flask and disposed between the flask compartments, means for vibrating the screen to shower the sand upon the pattern to form a shell mold, means for moving the pattern toward and in contact with the discharge end of the sand flask, means for inverting the yoke to discharge surplus sand mixture from the mold back into the sand flask, and means for stripping the shell mold from the pattern.

7. A machine for making shell molds, comprising a roll-over yoke, means carried by the yoke for supporting a pattern, a sand mixture flask carried by the yoke and registerable with the pattern supporting means, the flask being fixed in relation to the axis of the yoke and being formed with a storage compartment having an inlet end and a discharge compartment having a discharge end, inlet shutter means carried by the flask and arranged at the inlet end of the storage compartment, outlet shutter means carried by the flask and disposed between the storage compartment and the discharge compartment, vibrator means associated with the flask, a sifter screen carried by the flask and disposed between the flask compartments thereof, means for vibrating the screen to shower the sand upon the pattern to form a shell mold, means for moving the pattern toward and in contact with the discharge end of the sand flask, means for inverting the yoke to discharge surplus sand mixture from the mold back into the sand flask, and means for stripping the shell mold from the pattern.

8. A machine for making shell molds, comprising a roll-over yoke, a pattern support carried by the yoke for supporting a pattern, a sand mixture flask carried by the yoke and registerable with the pattern, the flask being fixed in relation to the axis of the yoke and being formed with a storage compartment and a discharge compartment, inlet shutter means carried by the flask and arranged at the inlet end of the storage compartment, outlet shutter means carried by the flask and disposed between the storage compartment and the discharge compartment, a sifting screen carried by the flask and disposed between the flask compartments, resilient means carried by the flask for mounting the screen, means for vibrating the screen to shower sand upon the pattern to form a shell mold, means for moving the pattern toward and in contact with the discharge end of the sand flask, means for inverting the yoke to discharge surplus sand mixture from the mold back into the sand flask, and means for stripping the shell mold from the pattern.

9. A machine for making shell molds, comprising a roll-over yoke, means carried by the yoke for supporting a pattern, a sand mixture flask carried by the yoke and registerable with the pattern supporting means, the sand flask being formed with a storage compartment having an inlet end and a discharge compartment having a discharge end, inlet shutter means carried by the flask and arranged at the inlet end of the storage compartment, outlet shutter means carried by the flask and disposed between the storage compartment and the discharge compartment for sprinkling sand onto a pattern to form a shell mold, means for moving the pattern toward and in contact with the discharge end of the sand flask, means for periodically and alternately actuating the inlet and outlet shutter means, means for inverting the yoke to discharge surplus sand mixture from the mold back into the flask, a plurality of obliquely-arranged baffle plates disposed in the storage compartment forming separate spaces for receiving surplus sand mixture returned to the storage compartment and for distributing such surplus mixture onto the outlet shutter means when the flask is again moved to its normal upright position, and means for stripping the shell mold from the pattern.

10. A machine for making shell molds, comprising a roll-over yoke, means carried by the yoke for supporting a pattern, a sand mixture flask carried by the yoke and registerable with the pattern supporting means, the sand flask being formed with a storage compartment having an inlet end and a discharge compartment having a discharge end, inlet shutter means carried by the flask and arranged at the inlet end of the storage compartment, outlet shutter means carried by the flask and disposed between the storage compartment and the discharge compartment for sprinkling sand onto the pattern to form a shell mold, means for moving the pattern toward and in contact with the discharge end of the sand flask, means for periodically and alternately actuating the inlet and outlet shutter means, vibrator means associated with the flask, means for inverting the yoke to discharge surplus sand mixture from the mold back into the flask, a plurality of obliquely-arranged baffle plates disposed in the storage compartment forming separate spaces for receiving surplus sand mixture returned to the storage compartment and for distributing such surplus mixture onto the outlet shutter means when the flask is again moved to its normal upright position, and means for stripping the shell mold from the pattern.

11. A machine for making shell molds, comprising a roll-over yoke, a pattern assembly carried by the yoke, the pattern assembly having a hollow body, a heater carried by the body for supporting a pattern, a sand mixture flask carried by the yoke and fixed in relation to the axis thereof, the flask having its discharge end spaced from and registerable with the pattern assembly, means for moving the pattern assembly toward and from the flask, means for sprinkling sand mixture through the flask and onto the registering pattern to form a shell mold, means for cooling the body, means for inverting the yoke to discharge surplus sand from the surface of the pattern back into the flask, and means for stripping the shell mold from the pattern.

12. A machine for making shell molds, comprising a pattern assembly having a hollow body, a heater carried by the body, a pattern plate carried by the heater and movable relatively therewith, a stripper plate carried by the body, and vibrator means associated with the stripper plate for stripping the mold from the pattern.

13. A machine for making shell molds, comprising a pattern assembly having a hollow body, a heater carried by the body, a pattern plate carried by the heater and movable relatively therewith, a stripper plate carried by the body, a vibrator for vibrating the pattern plate, and vibrator control means for interrupting the vibrator after predetermined movement of the stripper plate.

14. A machine for making shell molds, comprising an invertable pattern support, an invertable sand mixture flask registrable with the support and having its discharge end normally spaced from the support, the sand flask being formed with a storage compartment at its upper end and a discharge compartment at its lower end, shutter means carried by the flask and disposed between the storage and discharge compartments of the flask, means for moving the pattern assembly toward and from the discharge end of the sand flask, means for discharging sand mixture onto the pattern to form a shell mold, means for discharging the surplus sand from the mold back into the flask, a screen for catching clinkers in said surplus, the side wall of the flask being formed with a clinker opening to discharge sand clinkers from the flask as it is being inverted, and means for stripping the shell mold from the pattern.

15. A machine for making shell molds, comprising a roll-over yoke, a pattern supporting means carried by the yoke, a sand mixture flask carried by the yoke and registerable with the pattern supporting means, the flask being formed with a storage compartment and a discharge compartment, a sifting screen carried by the flask and disposed between the flask compartments thereof, means for moving the pattern supporting means toward and in contact with the discharge end of the sand flask, and means for inverting the yoke to discharge surplus sand mixture from the mold back into the sand flask.

16. A machine for making shell molds, comprising a roll-over yoke, a pattern supporting means carried by the yoke, a sand mixture flask carried by the yoke and registerable with the pattern supporting means, the flask being formed with a storage compartment and a discharge compartment, a sifting screen disposed between the flask compartments, means for moving the pattern supporting means toward and in contact with the discharge end of the sand flask, the discharge compartment of the flask being formed with a discharge opening below the screen and means for inverting the yoke, whereby substantially any sand clinkers caught on the screen will be discharged from the flask.

17. A machine for making shell molds, comprising a roll-over yoke, an invertible pattern assembly carried by the yoke, a sand flask adjacent the pattern assembly and having its discharge end spaced from and registerable with the pattern assembly, means for moving the pattern assembly and the discharge end of the sand flask toward and in contact with each other, means for supplying a metered amount of sand mixture to the sand flask at predetermined periods, and means for inverting the pattern assembly and the sand flask to discharge surplus sand mixture from the mold back into the sand flask.

18. A machine for making shell molds, comprising an invertible pattern assembly, having a pattern support, a pattern carried by the support, an invertible sand flask adjacent the pattern assembly and having its discharge end spaced from and registerable with the pattern support, means for moving the pattern and the discharge end of the sand flask toward and in contact with each other, means for supplying a metered amount of sand mixture to the sand flask at predetermined periods, and means for inverting the pattern support and the sand flask to discharge surplus sand mixture from the mold back into the sand flask.

19. A machine for making shell molds comprising a turntable, means disposed at one side of the table for supplying sand mixture, an oven disposed adjacent the table and spaced from the supply means, an invertible pattern assembly in cooperative relation with the table and having a pattern support, a pattern carried by the support, a sand mixture flask having its discharge end spaced from and registerable with the pattern support, means for moving the pattern and the discharge end of the sand flask toward and in contact with each other, means for supplying a metered amount of sand mixture to the sand flask at predetermined periods, means for inverting the pattern support and the sand flask to discharge surplus sand mixture from the mold back into the sand flask, and means for periodically rotating the table to bring the pattern and the mold into the oven.

20. A machine for making shell molds, comprising an invertible pattern assembly having a pattern support, a pattern carried by the support, an invertible sand mixture flask having its discharge end spaced from and registerable with the pattern support, means for moving the pattern assembly toward and in contact with the sand flask, means for inverting the pattern support and the sand flask to discharge surplus sand mixture from the mold back into the flask, and a plurality of obliquely-arranged baffle plates disposed in the sand flask forming separate spaces for receiving surplus sand mixture returned to the flask and for distributing such surplus mixture onto the pattern assembly when the flask is again moved to its upright position.

21. A machine for making shell molds, comprising a turntable, means disposed at one side of the table for supplying sand mixture, an oven disposed adjacent to the table and spaced from the supply means, an invertible pattern assembly in cooperative relation with the table and having a pattern support, a pattern carried by the support, a sand mixture flask adjacent the pattern assembly and having its discharge end spaced from and registerable with the pattern support, means for moving the pattern assembly toward and in contact with the sand flask, a plurality of obliquely-arranged baffle plates disposed in the sand flask forming separate spaces for receiving surplus sand mixture returned to the flask and for distributing such surplus mixture onto the pattern when the flask is again moved to its upright position, and means for periodically rotating the table to bring the pattern and the mold into the oven.

22. A machine for making shell molds, comprising a roll-over yoke, a sand mixture flask carried by the yoke and fixed in relation to the axis thereof, a pattern support for holding a pattern carried by the yoke and registerable with the sand flask, means carried by the yoke for moving the support toward and from the flask, means for discharging sand mixture from the flask onto the pattern to form a shell mold, means for inverting the yoke to discharge surplus sand mixture from the mold back into the sand flask, and means for stripping the mold from the pattern.

23. A machine for making shell molds, comprising a roll-over yoke, a sand mixture flask carried by the yoke and fixed in relation to the axis thereof, a pattern support for holding a pattern carried by the yoke and registerable with the sand flask, a screen carried by said flask, means carried by the yoke for moving the support toward and from the flask, means for sprinkling sand mixture from the flask onto the pattern to form a shell mold, means for inverting the yoke to discharge surplus sand mixture from the mold back into the flask, the side wall of the flask being formed with a clinker opening to discharge sand clinkers from the flask as it is being inverted, and means for stripping the mold from the pattern.

24. A machine for making shell molds, comprising a roll-over yoke, a sand mixture flask carried by the yoke and fixed in relation to the axis thereof, the sand flask being tubular in form and having an open discharge mouth at its lower end, a shutter controlled inlet at the upper end of the flask, a pattern support for holding a pattern carried by the yoke and registerable with the sand flask, means carried by the yoke for moving the support toward and from the flask, means for sprinkling sand mixture from the flask onto the pattern to form a shell mold, means for inverting the yoke to discharge surplus sand mixture from the mold back into the flask, the side wall of the flask being formed with a clinker opening to discharge sand clinkers from the flask as it is being inverted, and means for stripping the mold from the pattern.

25. A machine for making shell molds, comprising a roll-over yoke, a sand mixture flask carried by the yoke and fixed in relation to the axis thereof, the sand flask being formed with a storage compartment and a discharge compartment, inlet shutter means carried by the flask and arranged at the inlet end of the storage compartment, outlet shutter means carried by the flask and disposed between the storage compartment and the discharge compartment, a pattern support carried by said yoke and registerable with said flask, means carried by the yoke for moving the pattern support toward and in contact with the discharge end of the sand flask, vibrator means associated with the said flask for sprinkling sand mixture onto the pattern to form a shell mold, means for inverting the yoke to discharge surplus sand from the mold back into the sand flask, and means for stripping the shell mold from the pattern.

26. A machine for making shell molds, comprising a roll-over yoke, a sand mixture flask carried by the yoke and fixed in relation to the axis thereof, the sand flask being formed with a storage compartment and a discharge compartment, a pattern support carried by the yoke and registerable with the sand flask, a pattern carried by said support, inlet shutter means carried by the flask and arranged at the inlet end of the storage compartment, outlet shutter means carried by the flask and disposed between the storage compartment and the discharge compartment for sprinkling sand onto the pattern to form a shell mold, means carried by the yoke for moving the pattern support toward and from the flask, and means for inverting the yoke to discharge surplus sand mixture from the mold back into the sand flask.

27. A machine for making shell molds, comprising a roll-over yoke, a sand mixture flask carried by the yoke and fixed in relation to the axis thereof, the sand flask being formed with a storage compartment and a discharge compartment, a pattern support carried by the yoke and registerable with the sand flask and adapted to support a pattern, inlet shutter means carried by the flask and arranged at the inlet end of the storage compartment, outlet shutter means carried by the flask and disposed between the storage compartment and the discharge compartment for sprinkling sand onto the pattern to form a shell mold, means carried by the yoke for moving the support toward and from the flask, vibrator means associated with the flask, and means for inverting the yoke to discharge surplus sand mixture from the mold back into the sand flask.

28. A machine for making shell molds, comprising a roll-over yoke, a sand mixture flask carried by the yoke and fixed in relation to the axis thereof, a pattern support for holding a pattern carried by the yoke and registerable with the sand flask, a screen carried by said flask, means carried by the yoke for moving the support toward and from the flask, means for sprinkling sand mixture from the flask onto the pattern to form a shell mold, means for inverting the yoke to discharge surplus sand mixture from the mold back into the flask, and means for stripping the mold from the pattern.

29. A machine for making shell molds, comprising a roll-over yoke, a sand mixture flask carried by the yoke and fixed in relation to the axis thereof, the flask being formed with a storage compartment and a discharge compartment, a pattern support carried by said yoke and registerable with said flask, a sifting screen carried by the flask and disposed between the compartments thereof, resilient means carried by the flask for mounting the screen, means for vibrating the screen to shower sand upon the pattern to form a shell mold, means carried by the yoke for moving the support toward and from the flask, means for discharging sand mixture from the flask onto the pattern to form a shell mold, means for inverting the yoke to discharge surplus sand mixture from the mold back into the sand flask, and means for stripping the mold from the pattern.

30. A machine for making shell molds, comprising a roll-over yoke, a pattern assembly, an oven for receiving said pattern assembly, means carried by the yoke for supporting the assembly, a sand mixture flask carried by the yoke and fixed in relation to the axis thereof, the flask having its discharge end normally spaced from and registerable with the pattern assembly, actuating means for moving the pattern assembly toward and from the discharge end of the sand flask, means for adjusting the distance between the pattern and the oven, means for sprinkling sand mixture through the flask and onto the registering pattern assembly to form a shell mold, and means for inverting the yoke to discharge surplus sand from the surface of the assembly back into the flask.

31. A machine for making shell molds, comprising a turntable, a plurality of pattern supports carried by said turntable, a pattern carried by each support, a sand flask registerable with each pattern support, means disposed at one side of said table for supplying a measured amount of sand mixture at predetermined periods, an oven disposed adjacent to said table and spaced from said supply means, means for periodically dumping said mixture from the supply means into said flask, means carried by said flask for discharging consistent amounts of sand mixture onto each pattern to form a shell mold, means for periodically rotating the turntable to successively bring each pattern into said oven, means for inverting the pattern support to return surplus sand mixture from said pattern into said flask, and a plurality of obliquely-arranged baffle plates disposed in said flask forming separate spaces for receiving surplus sand mixture returned to the flask and for distributing such surplus sand mixture onto said pattern assembly when said flask is again moved to its upright position.

32. A machine for making shell molds comprising a supporting unit, a shaft rotatably carried by said unit and having one end projecting therefrom, a yoke rotatably mounted upon the projecting end of said shaft, a sand box carried by said yoke and having its discharge end exposed, a pattern support registerable with the discharge end of said sand box, a pattern mounted upon said support, means carried by said yoke to bring said pattern in sealing contact with the open end of said sand box, means carried by said box for releasing sand therefrom, and means carried by said unit for oscillating said assembly to invert said sand box to shower sand through said open end upon said pattern and to return said assembly to its initial position.

33. A machine for making shell molds, comprising a supporting unit including a shaft, a roll-over yoke supported by the shaft for movement about the shaft axis, a sand mixture flask carried by the yoke, a pattern support carried by the yoke, means mounting the flask and pattern support in opposed relation to each other and including means confining the relative movement between the flask and the pattern support to a fixed path radially of the shaft for bringing the flask and pattern member into sealing relation, and means carried by said flask for showering sand upon said pattern support, means for imparting oscillating movement to the yoke to successively discharge excess mixture from the pattern member and to return said pattern support and sand box to its initial position.

34. A machine for making shell molds comprising a supporting unit, a shaft rotatably carried by said unit and having one end projecting therefrom, a yoke rotatably mounted upon the projecting end of said shaft, a sand box carried by said yoke and having its discharge end exposed, a pattern support registerable with the exposed end of said sand box, a pattern mounted upon said support, means carried by said yoke to bring said pattern in sealing contact with the open end of said sand box, means carried by said box for showering sand through said open end upon said pattern, means carried by said unit for oscillating said assembly to invert said sand box to return surplus sand to said flask and to return the pattern support and sand box assembly to its initial position, and means adjacent said sand box for automatically discharging a predetermined amount of sand therein.

35. A machine for making shell molds, comprising a supporting unit, a shaft journaled in said unit and having one of its ends projecting therefrom, a roll-over yoke carried by the projecting end of said shaft, a sand mixture flask carried by said yoke, a pattern also carried by the yoke and movable into sealing registration with the flask and means for imparting oscillating movement to said shaft.

36. A machine for making shell molds, comprising a turntable, a pattern support carried by the turntable, a supporting unit adjacent the turntable, a shaft journaled in said unit and having one of its ends projecting therefrom, a roll-over yoke carried by the projecting end of said shaft, a sand mixture flask carried by said yoke, a pattern also carried by the yoke in opposition to said flask and movable into sealing relationship with the flask, and means for imparting oscillating movement to said shaft.

37. A machine for making shell molds, comprising a roll-over yoke, means carried by the yoke for supporting a pattern, a sand mixture flask carried by the yoke and registerable with the pattern supporting means, the sand flask being formed with a storage compartment having an inlet end and with a discharge compartment having a discharge end, shutter means disposed between the storage compartment and the discharge compartment, means for showering sand upon the pattern to form a shell mold, means for moving said pattern toward and in contact with the discharge end of said flask, means for inverting the yoke to discharge surplus sand mixture from the mold back into the flask, and a plurality of obliquely arranged baffle plates of graduated lengths disposed in the storage compartment forming separate spaces for receiving and distributing the surplus sand mixture returned to the storage compartment when the flask is again moved to its upright position.

38. A machine for making shell molds, comprising a pattern assembly having an individual hollow body, means for cooling said body, a heater carried by said body, a pattern carried by said body, a stripper plate registerable with said pattern, and means for actuating said stripper to strip the mold from the pattern.

39. A machine for making shell molds, comprising a roll-over yoke, a sand mixture flask carried by the yoke, said sand flask being formed with a storage compartment and with a discharge compartment, a pattern support carried by said yoke, a pattern mounted upon said support, the discharge compartment of said flask being open at its discharge end, means carried by said yoke for moving the pattern support toward and from said flask, shutter means at the upper end of said discharge compartment for sprinkling sand mixture onto the pattern, said shutter means being spaced above the open end of said discharge compartment a distance which will allow sand to fall with sufficient impactive force to produce a packed mold upon said pattern, and means for inverting the yoke to discharge surplus sand mixture from the mold back into the flask.

40. A machine for making shell molds, comprising a roll-over yoke, a sand mixture flask carried by the yoke, said flask having an open discharge end, a pattern support carried by said yoke, a pattern mounted upon said support, means carried by said yoke for moving said pattern support toward and from said flask, means carried by said flask and so located with respect to said open end that sand sprinkled therefrom will be allowed to fall with sufficient impactive force to produce a packed mold upon said pattern, and means for inverting the yoke to discharge surplus sand mixture from the mold back into the flask.

41. A machine for making shell molds, comprising a roll-over yoke, a sand mixture flask carried by the yoke, said flask having an open discharge end, a pattern support carried by said yoke, a pattern mounted upon said support, means carried by said yoke for moving said pattern support toward and from said flask, a plurality of obliquely-arranged baffle plates carried by said flask and so located with respect to said open end that sand sprinkled therefrom will be allowed to fall with sufficient impactive force to produce a packed mold upon said pattern, and means for inverting the yoke to discharge surplus sand mixture from the mold back into the flask.

42. A machine for making shell molds, comprising a roll-over yoke, a sand mixture flask carried by the yoke, said flask having an open discharge end, a pattern support carried by said yoke, a pattern mounted upon said support, means carried by said yoke for moving said pattern support toward and from said flask, a plurality of inclined baffle plates of graduated lengths carried by said flask and so located with respect to said open end that sand sprinkled therefrom will be allowed to fall with sufficient impactive force to produce a packed mold upon said pattern, and means for inverting the yoke to discharge surplus sand mixture from the mold back into the flask.

43. A machine for making shell molds, comprising an invertible pattern assembly having a pattern support, a pattern carried by the support, an invertible sand mixture flask having its discharge end spaced from and registerable with the pattern support, means for moving the pattern assembly toward and in contact with the sand flask, means for inverting the pattern support and the sand flask to discharge surplus sand mixture from the mold back into the flask, and a plurality of baffle plates disposed in the sand flask forming separate spaces for receiving surplus sand mixture returning to the flask and for distributing such surplus mixture onto the pattern assembly when the flask is again moved to its upright position.

44. A machine for making shell molds, comprising a pattern assembly having a hollow body, means for cooling said body, a pattern heater carried by said body, a pattern carried by said heater, a stripper plate carried by said body, and means for actuating the stripper plate to strip the mold from said pattern.

45. A machine for making shell molds, comprising an invertible sand mixture flask, said flask having an open discharge end, a pattern support disposed adjacent said flask and registerable with said discharge end, a pattern mounted upon said support, means for moving said pattern toward and from said flask, means for discharging sand from said flask and allowing it to fall upon said pattern with sufficient impactive force to produce a packed mold, means for inverting the flask to discharge surplus sand mixture from the mold back into the flask, and an individual heater disposed adjacent said pattern.

46. A machine for making shell molds, comprising a roll-over yoke, a pattern support carried by the yoke for holding a pattern, a sand mixture flask carried by the yoke and registerable with the pattern support, the sand flask being fixed in relation to the axis of the yoke and being formed with a storage compartment and a discharge compartment, inlet shutter means carried by the flask and arranged at the inlet end of the storage compartment, outlet shutter means carried by the flask and disposed between the storage compartment and the discharge compartment, means for moving the pattern toward and in contact with the discharge end of the sand flask, means associated with the flask for sprinkling sand mixture onto the pattern to form a shell mold, means for inverting the yoke to discharge surplus sand from the mold back into the sand flask, and means for stripping the shell mold from the pattern.

References Cited in the file of this patent

UNITED STATES PATENTS

| | | |
|---|---|---|
| 360,011 | Guntz | Mar. 29, 1887 |
| 1,796,394 | Pickop | Mar. 17, 1931 |
| 2,630,608 | Granath | Mar. 10, 1953 |
| 2,659,945 | Valyi | Nov. 24, 1953 |
| 2,695,431 | Davis | Nov. 30, 1954 |
| 2,733,489 | Dahmer | Feb. 7, 1956 |
| 2,741,005 | Hurst | Apr. 10, 1956 |

OTHER REFERENCES

The Foundry, August 1950, pages 206–217.
The Iron Age, April 19, 1951, pages 81–85.
Fortune, July 1952, pages 104, 105, 106, 140 and 143.
Am. Foundryman, August 1952, pages 42–46.
Foundry, November 1952, page 265.

UNITED STATES PATENT OFFICE
CERTIFICATE OF CORRECTION

Patent No. 2,852,819                                                        September 23, 1958

Otto W. Winter

It is hereby certified that error appears in the printed specification of the above numbered patent requiring correction and that the said Letters Patent should read as corrected below.

Column 6, line 24, for "cylinder" read -- cylinders --; column 7, line 24, for "scale" read -- scales --; column 19, lines 48 and 49 should read as shown below instead of as in the patent -- pattern assembly having a hollow body, means
        for cooling said body, an individual heater
        carried by said body, a Signed and sealed this 23rd day of December 1958.

(SEAL)
Attest:

KARL H. AXLINE
Attesting Officer

ROBERT C. WATSON
                                                                             Commissioner of Patents